US005997308A

United States Patent [19]

Semba

[11] Patent Number: 5,997,308

[45] Date of Patent: Dec. 7, 1999

[54] APPARATUS FOR DISPLAYING WORDS IN A KARAOKE SYSTEM

[75] Inventor: Youji Semba, Hamamatsu, Japan

[73] Assignee: Yamaha Corporation, Hamamatsu, Japan

[21] Appl. No.: 08/902,429

[22] Filed: Jul. 29, 1997

[30] Foreign Application Priority Data

Aug. 2, 1996 [JP] Japan .................................... 8-205101

[51] Int. Cl.[6] ............................... G10H 1/36; G09B 5/00

[52] U.S. Cl. ................................. 434/307 A; 434/307 R; 84/609

[58] Field of Search ................................ 434/307 R–309, 434/318, 365; 84/477 R, 609–610, 631, 634, 636, 645; 345/116, 141, 144, 150; 348/484, 564, 589, 599, 600; 360/32, 72.2; 386/46, 96, 97, 105; 341/35; 369/53

[56] References Cited

U.S. PATENT DOCUMENTS

| | | | |
|---|---|---|---|
| 5,194,683 | 3/1993 | Tsumura et al. | 434/307 A |
| 5,208,413 | 5/1993 | Tsumura et al. | 434/307 A |
| 5,208,679 | 5/1993 | Yamauchi et al. | 386/105 |
| 5,287,789 | 2/1994 | Zimmerman | 84/477 R |
| 5,336,844 | 8/1994 | Yamauchi et al. | 84/602 |
| 5,453,570 | 9/1995 | Umeda et al. | 84/636 |
| 5,454,723 | 10/1995 | Horii | 434/307 A |
| 5,499,921 | 3/1996 | Sone | 434/307 A |
| 5,621,182 | 4/1997 | Matsumoto | 84/610 |
| 5,654,516 | 8/1997 | Tashiro et al. | 84/610 |
| 5,663,516 | 9/1997 | Kawashima | 84/610 |
| 5,726,649 | 3/1998 | Tamaru et al. | 341/35 |
| 5,857,171 | 1/1999 | Kageyama et al. | 84/610 X |
| 8,726,373 | 3/1998 | Choi et al. | 84/609 |

*Primary Examiner*—Joe H. Cheng
*Attorney, Agent, or Firm*—Pillsbury Madison & Sutro LLP

[57] ABSTRACT

In accordance with the progress of a performance, a CPU 10 supplies word data indicative of words to be displayed. The CPU obtains a color change function passing coordinates which are specified by color change function data indicative of: a length of each of sections which are obtained by dividing a word display region to be displayed in accordance with the word data; and a time period required for changing a color of the section. The CPU instructs a color change in accordance with the color change function. A video circuit 18 changes the color of the words which are displayed on the basis of the word data, in accordance with the color change instructions, and a monitor 19 displays the words.

5 Claims, 5 Drawing Sheets

APPARATUS FOR DISPLAYING WORDS IN A KARAOKE SYSTEM

BACKGROUND OF THE INVENTION

1. Field of the Invention

The invention relates to an apparatus for displaying words in a karaoke system which generates musical tones on the basis of performance data, displays words, and changes the color of the words in accordance with the progress of the performance.

2. Related Art

In a known technique of this kind, word data (lyric data) are supplied so that words (lyric) are displayed on a monitor or the like, and information indicative of the speed of changing the color of the displayed word region is supplied in synchronization with the progress of the performance. According to this technique, when the user or the singer can sing a song in accordance with the color change of the words, the singing process can correspond to the progress of the performance.

However, the technique has drawbacks as discussed below. In order to finely change the color change speed of the words, or to smoothly conduct the color change in a stepless manner in an extreme case, information instructing the color change speed must be supplied with finely changing it for each of minute sections. Actually, such a control is very difficult to conduct and requires a massive amount of data.

SUMMARY OF THE INVENTION

The invention has been conducted in view of the above-discussed circumstances. It is an object of the invention to provide an apparatus for displaying words in a karaoke system which can smoothly conduct a color change of words with a small amount of data.

In order to solve the problem, according to the invention, an apparatus for displaying words in a karaoke system comprises: word data supplying means for, in accordance with a progress of a performance, supplying word data indicative of words to be displayed; section data supplying means for dividing a word display region which is to be displayed in accordance with the word data, into two or more sections, and for supplying section length data indicative of a length of each of the sections, and section time period data indicative of a time period required for changing a color of words in the section; color change instructing means for obtaining a word color change function which passes coordinates or the vicinity of the coordinates, the coordinates being specified by the supplied section length data and section time period data, and for instructing a color change in accordance with the function; and word displaying means for changing the color of the words which are displayed on the basis of the word data, in accordance with the color change instructing means.

According to the invention, the word display region which is to be displayed in accordance with the word data is divided into two or more sections, and a color change function which passes coordinates or the vicinity of the coordinates is obtained. The coordinates are specified by section length data indicative of the length of each of the sections, and also by section time period data indicative of the time period of the section. The color of the word display region which is displayed on the basis of the word data is changed in accordance with instructions based on the color change function. Therefore, a color change of words can be smoothly conducted, and the amount of data required for the color change can be extremely reduced.

DETAILED DESCRIPTION OF THE PREFERRED EMBODIMENTS

Hereinafter, an embodiment of the invention will be described with reference to the accompanying drawings.

<1: Whole configuration>

Figure 1:
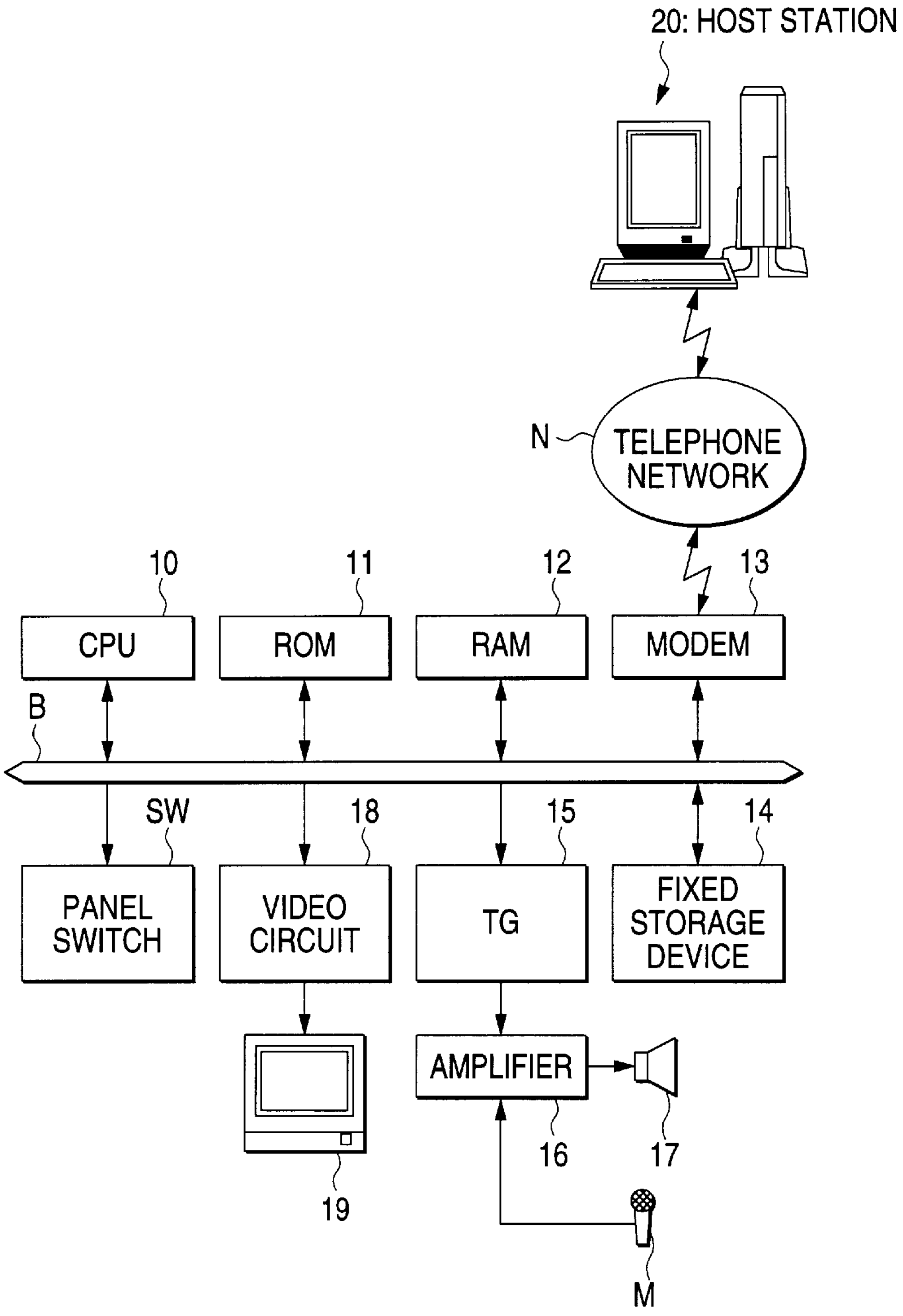
FIG. 1 is a block diagram showing the configuration of a karaoke apparatus of an embodiment of the invention.

FIG. 1 is a block diagram showing the configuration of a karaoke apparatus of the embodiment.

In the figure, 10 designates a CPU which controls components connected to the CPU via a bus B. The reference numeral 11 designates a ROM which stores basic programs used in the CPU 10. The reference numeral 12 designates a RAM in which registers are set by the control of the CPU 10 so as to temporarily store data, programs, etc.

The reference numeral 13 designates a modem through which data are received from and sent to a host station 20 via a telephone network N. The reference numeral 14 designates a fixed storage device which is configured by an HDD (hard disk drive) or the like and which stores main programs used in the CPU 10, music-piece data, etc.

The reference numeral 15 designates a tone generator (TG) which synthesizes musical tones on the basis of performance data included in music-piece data that will be described later. The reference numeral 16 designates an amplifier which amplifies a musical-tone synthesized by the tone generator 15, and a signal from a microphone M, thereby enabling the signals to be output as a sound via a loudspeaker 17.

The reference numeral 18 designates a video circuit configured by a DSP, a V-RAM, a RAMDAC, and the like. Word data are supplied in time series to the circuit from the CPU 10 which controls sequencer programs. The DSP interprets the word data. The interpretation data are written into an area of the V-RAM corresponding to the display region of a monitor 19, and at the same time read out in accordance with the scanning frequency of the monitor 19. The read out data are converted into an analog signal (video signal) by the RAMDAC, and then supplied to the monitor 19. As a result, a display corresponding to the data written into the V-RAM is conducted on the monitor 19.

The reference numeral SW designates a panel switch comprising a switch for selecting the user's desired music piece, and controllers for setting the volume, the scale, etc. The set information is supplied to the CPU 10.

<1-1: Musical data>

The configuration of musical data used in the embodiment will be described with reference to FIG. 2(*a*).

As shown in the figure, each musical data consists of: a header indicating configuration information of the data and the like; performance data which are formed by recording in series data contents of musical tones to be output as a sound, in time series in accordance with, for example, the MIDI standard; and a word track in which information of words to be displayed in accordance with the progress of the performance is recorded in time series.

<1-1-1: Performance data>

The performance data consist of first to sixteenth tracks respectively corresponding to performance parts. As shown in FIG. 2(*b*), each track is a collection of data of events which are to take place in the corresponding performance part, such as sound generation event data instructing sound generation, and sound degeneration event data instructing sound degeneration. Between such event data, a data Δt indicative of the duration of the event is inserted. When the duration corresponds to a quarter note, a value "24" is inserted as the data Δt. Each sound generation event data is configured by, for example, various data defining the tone color, the pitch, the loudness, and the like of the musical tone which is to be generated by the event data.

<1-1-2: Word data>

Figure 2:
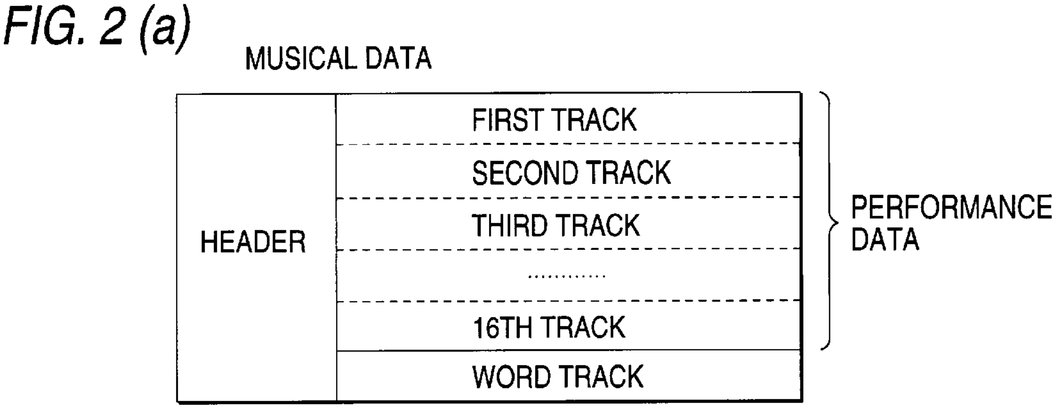
FIG. 2(*a*)–(*c*) is a diagram showing the configuration of data used in the apparatus.
Figure 2:
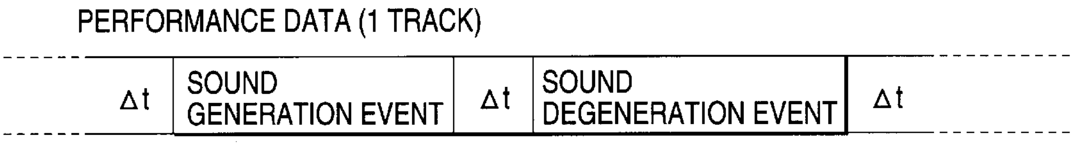
Figure 2:
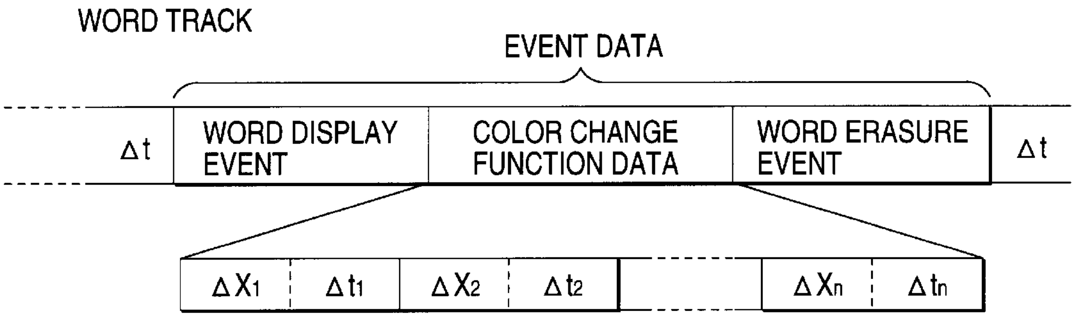

As shown in FIG. 2, each word track consists of: event data relating to a word display, more particularly, word display event data instructing the display of words in accordance with the progress of the performance; color change function data indicative of the length of the color change section and the progress time of the section; and word display event data instructing the erasure of the displayed words. In the same manner as the performance data, between such event data, a data Δt indicative of the duration of the event is inserted.

Among the data, the word display event data is configured by, for example, various data defining characters of the words which are to be displayed by the data, the character color, the format, the character font, the positions of the characters, and the like.

Color change function data $\Delta X_1$ to $\Delta X_n$ and $\Delta t_1$ to $\Delta t_n$ are used for producing color change functions which will be described later. The former data $\Delta X_1$ to $\Delta X_n$ represent the section lengths of word display regions which are displayed by respective word display event data, by means of a character number in the unit of "chr," respectively. The latter data $\Delta t_1$ to $\Delta t_n$ represent the progress times of the sections indicated by the data $\Delta X_1$ to $\Delta X_n$, by means of an activation period of an interruption process in the unit of "cnt," respectively.

These units are not ones which are generally used in the field, and but ones which are used only in this specification for the sake of convenience. In the embodiment, a character which is to be displayed as a part of words is configured by 48 dots high by 48 dots wide. In other words, "1 chr" corresponds to "48 dots."

<2: Operation>

Next, the operation of the embodiment will be described. First, the user who is the singer operates the operation panel SW to select a desired karaoke performance music piece. The CPU 10 then judges whether the music piece data of the performance music piece are stored in the fixed storage device 14 or not. If the music piece data are stored, the music piece data are directly read out from the fixed storage device 14 and then loaded into the RAM 12. If the music piece data are not stored, the CPU requests the host station 20 via the modem 13 and the telephone network N to transfer the music piece data of the performance music piece. In response to the request, the host station 20 searches the music piece data and then transfers the data to the karaoke apparatus which is a terminal station. When the CPU 10 detects the reception of the data, the CPU 10 loads the music data into the RAM 12.

Figure 5:
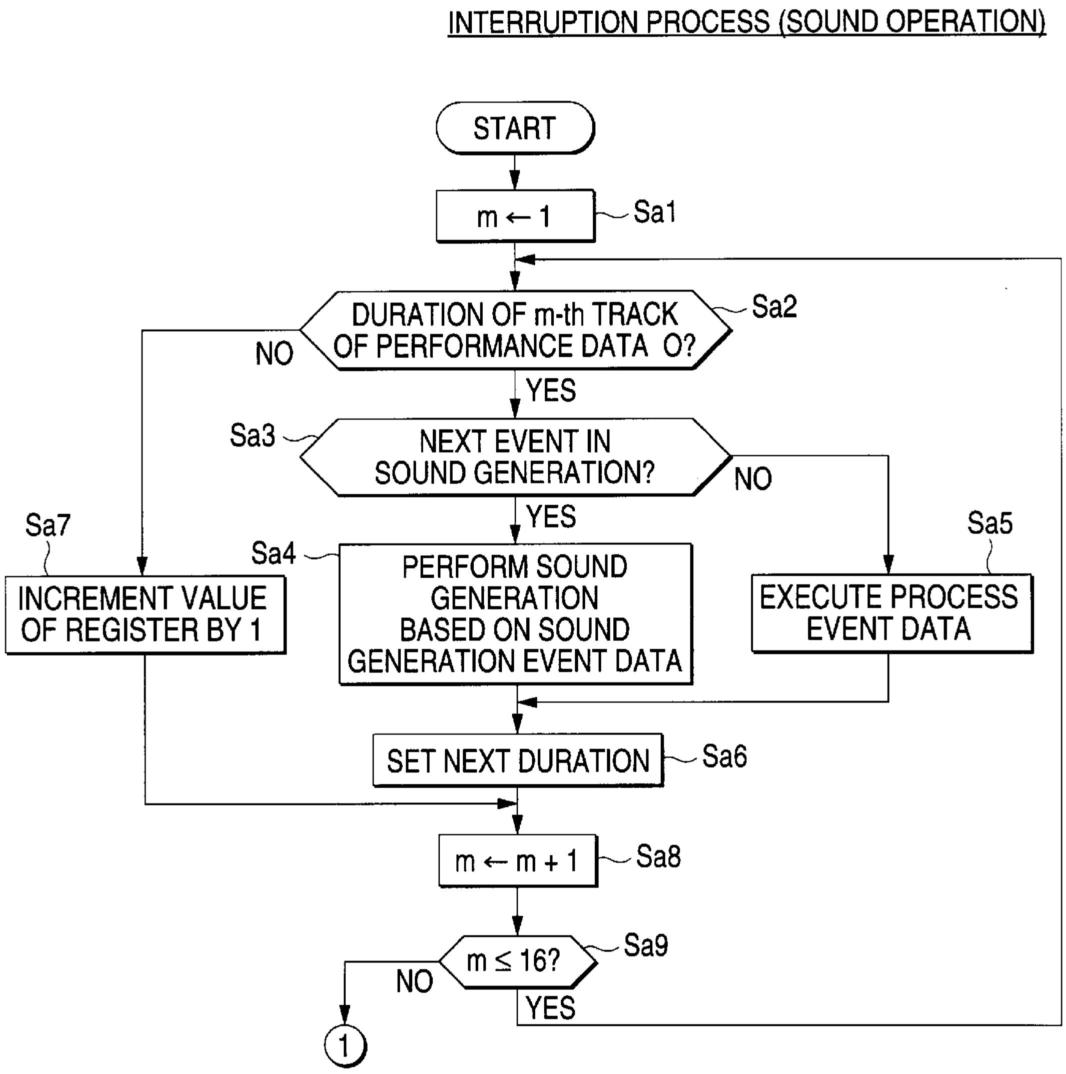
FIG. 5 is a flowchart showing the operation of an interruption process which is activated in a period corresponding to a performance tempo.
Figure 6:
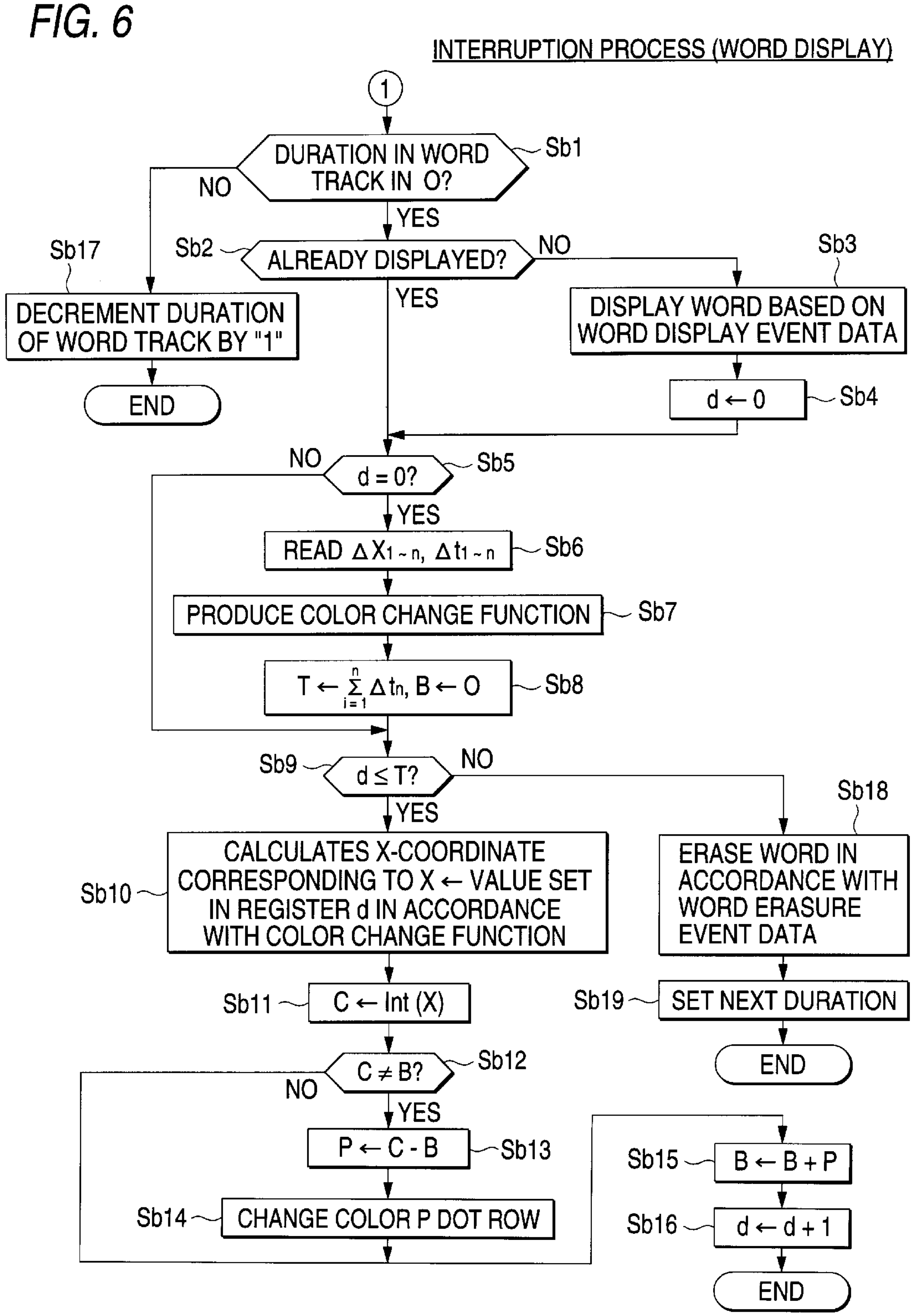
FIG. 6 is a flowchart showing the operation of the interruption process.

When the start of the performance is instructed through the panel switch SW or the like, the CPU 10 activates the interruption process shown in FIGS. 5 and 6 at the rate of 24 times for a quarter note of the music piece. In other words, the CPU 10 activates the interruption process which will be described below, at duration corresponding to the performance tempo, and executes various processes in accordance with the progress of the performance.

<2-1: Process of performance data>

When the interruption process is activated, the CPU 10 first sets in step Sa1 shown in FIG. 5 a register m indicating the performance track to be processed, to be "1." In step Sa2, the CPU 10 judges whether the duration of the track indicated by the value of the register m is zero or not. In the case where the process of step Sa2 is executed for the first time, for example, the initial value of the register m is "1," and hence it is judged whether the duration of the first track is zero or not. When the duration of performance data is "0," it means that the progress of the performance reaches the timing when a process corresponding to any event is to be executed in the track.

Therefore, the CPU 10 judges in step Sa3 whether the event data situated next to the duration data is a sound generation event data or not. If the judgement result is "YES," the CPU 10 transfers in step Sa4 the sound generation event data to the tone generator 15. Then, musical-tone signals based on the sound generation event data are synthesized and the sound generation is actually conducted. By contrast, if the judgement result is "NO," the CPU 10 executes a process corresponding to the event. When the event is the sound degeneration event, for example, the sound degeneration event data is transferred to the tone generator 15, and the sound degeneration process for musical tones indicated by the sound degeneration event is executed.

After the process of step Sa4 or Sa5 is executed, the CPU 10 reads in step Sa6 the duration data situated next to the event data, in order to prepare for the next event.

If it is judged in step Sa2 that the duration of the track indicated by the value of the register m is not zero, it means that the progress of the performance has not yet reached the timing when a process corresponding to an event is to be executed in the track. Therefore, the CPU 10 decrements in step Sa7 the duration of the track by "1" in correspondence with this activation of the interruption process.

After the process of step Sa6 or Sa7 is executed, the CPU 10 increments in step Sa8 the value of the register m by "1" in order to execute the same process on the next track. Thereafter, the CPU 10 judges in step Sa9 whether the value set in the register m is equal to or smaller than "16" or not.

If the judgement result is "YES," the CPU 10 returns the process procedure to step Sa2 and executes the same process on the track of the value which is set as a result of the increment.

By contrast, if the judgement result is "NO," it means that all processes which are to be executed on the performance data of the first to sixteenth tracks in this activation of the interruption process have been completed. Therefore, the CPU 10 then advances the process procedure to step Sb1 shown in FIG. 6 in order to execute processes on the word track.

<2-2: Process on word track>

Next, in step Sb1 shown in FIG. 6, the CPU 10 judges whether the duration of the word track is zero or not.

If the judgement result is "NO," it means that the progress of the performance has not yet reached the timing when a process on the word display is to be executed. Therefore, the CPU 10 decrements in step Sb17 the duration of the word track by "1" in correspondence with this activation of the interruption process, and immediately terminates the interruption process.

If the judgement result is "YES," it means that the progress of the performance reaches the timing when words are to be displayed. Therefore, the CPU 10 judges in step Sb2 whether words have been already displayed or not. If words have not yet been displayed, the CPU 10 transfers data (the character font and the character display position) based on the word display event data, to the video circuit 18. As a result, words based on the word display event data are displayed on the monitor 19. Thereafter, the CPU 10 resets in step Sb4 a register d to be zero.

If the judgement result of step Sb2 is "NO," or if the process of step Sb4 is executed, the CPU 10 judges in step Sb5 whether the value set in the register d is zero or not. The value set in the register d is incremented by "1" each time when the interruption process is activated in step Sb16 which will be described later. Consequently, the value indicates the accumulated number of interruption processes which are activated after the activation of the word display event. If the value set in the register d is not zero, therefore, it means that the interruption process has been activated several times after the word display event. In this case, it is not required to execute the processes of the subsequent steps Sb6 to Sb8, and hence the CPU 10 skips the process procedure to step Sb9.

By contrast, if the value set in the register d is zero, the CPU 10 reads in step Sb6 all of the color change function data $\Delta X_1$ to $\Delta X_n$ and $\Delta t_1$ to $\Delta t_n$ situated next to the word display event data. In step Sb7, prior to a color change process, the color change function is produced from the data in the following manner.

Figure 4:
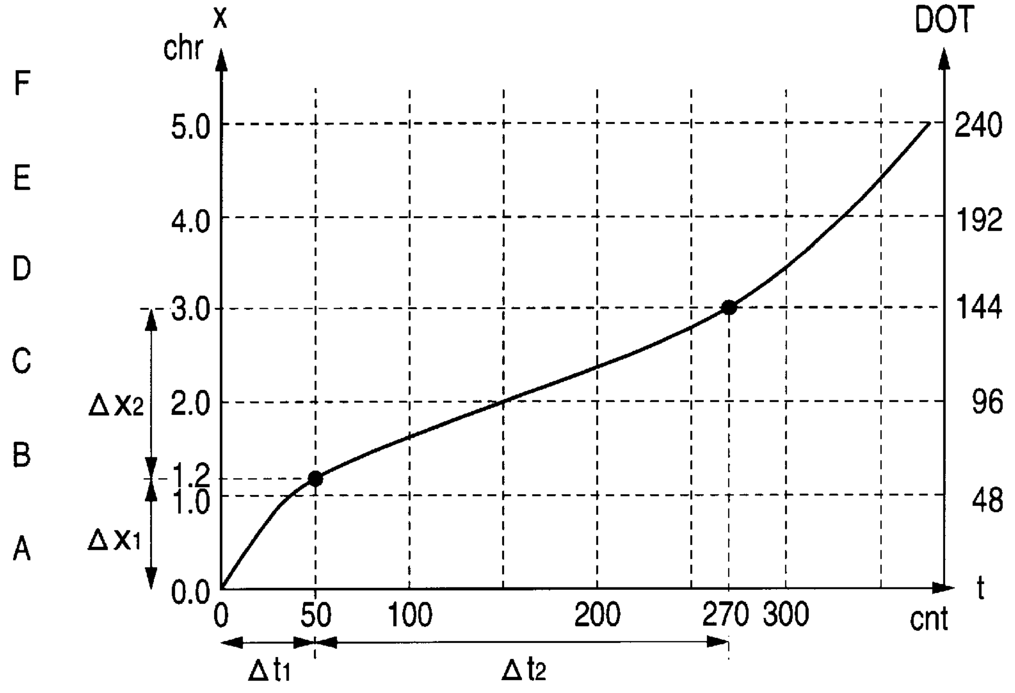
FIG. 4(*a*) and (*b*) is a graph showing relationships between the number of activations of an interruption process in the apparatus and the progress of the color change.
Figure 4:
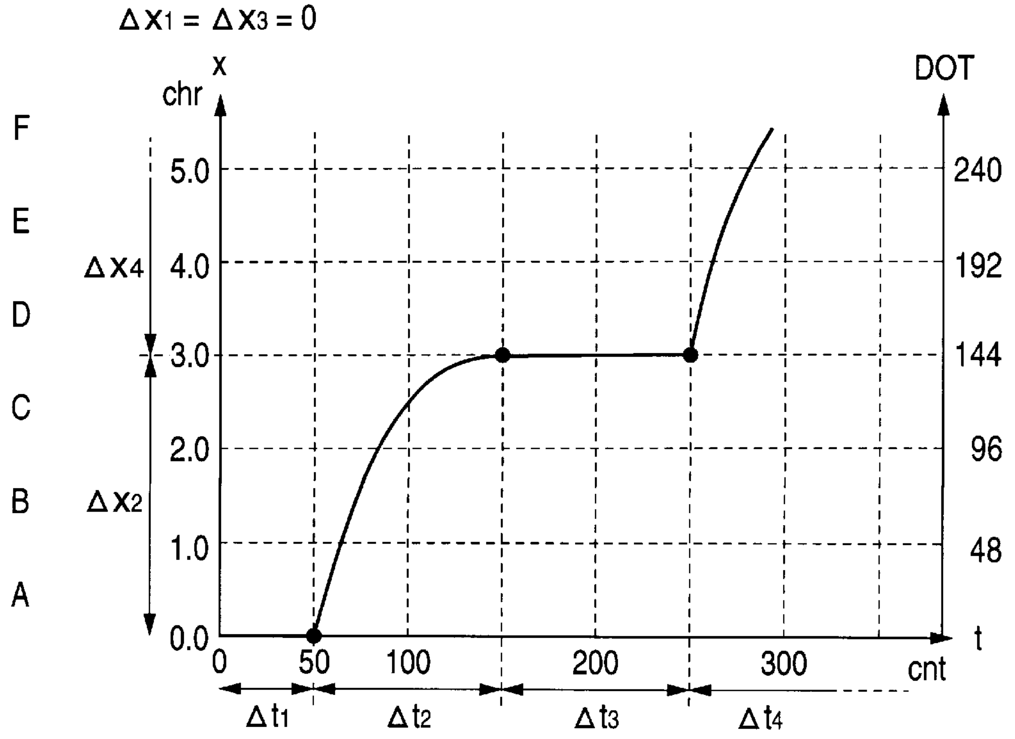

In principle, the CPU 10 first plots coordinates designated by the color change function data, and second specifies a color change function passing these coordinates by using, for example, a spline function, or a function of degree n. When the color change function data are set as follows, i.e., $\Delta X_1$=1.2 chr, $\Delta t_1$=50 cnt, $\Delta X_2$=1.8 chr, $\Delta t_2$=220 cnt, . . . , for example, the color change function is specified as shown in FIG. 4(*a*).

When there is a data set in which $\Delta X_n=0$ and $\Delta t_n\neq 0$, the CPU 10 interpolates the section by a linear function. In this case, a data designating that the color change function is discontinuously changed after the section may be added as a color change function data. When the color change function data are set as follows, i.e., $\Delta X_1$=0 chr, $\Delta t_1$=50 cnt, $\Delta X_2$=3.0 chr, $\Delta t_2$=100 cnt, $\Delta X_3$=0 chr, $\Delta t_3$=100 cnt, . . . and a discontinuous change of the color change function is designated after the section defined by $\Delta X_1$ and $\Delta t_1$ and that defined by $\Delta X_3$ and $\Delta t_3$, the color change function is produced as shown in FIG. 4(*b*).

After all, the color change function indicates the distance of the position where the color change is to be conducted, from the left end of the word display region displayed by a word display event, with respect to the accumulated number of interruption processes which are activated after the word display event.

Next, the CPU 10 calculates in step Sb8 the total sum of the data $\Delta t_1$ to $\Delta t_n$, sets the total sum to a register T, and resets a register B indicating the accumulated number of dots which have been changed in color after the word display event, to be zero.

The CPU 10 then judges in step Sb9 whether the value set in the register d is equal to or smaller than that set in the register T or not. As described above, the value set in the register d indicates the accumulated number of interruption processes which are activated after the word display event, and the total sum of the data $\Delta t_1$ to $\Delta t_n$ set in the register T indicates the section in which words are to be displayed by the word display event, by means of the number of activations of the interruption process.

If the judgement result is "NO," therefore, it means that the progress of the performance reaches the timing when the words due to the word display event are to be erased. Therefore, the CPU 10 transfers in step Sb18 word erasure event data situated next to the color change function data, to the video circuit 18, thereby erasing the words displayed on the monitor 19, and reads in step Sb19 the duration data $\Delta t$ situated next to the word erasure event data so as to prepare for the next word display event.

By contrast, if the judgement result of step Sb9 is "YES," the CPU 10 refers in step Sb10 the color change function which is previously produced, and calculates down to the first decimal place of the value (the number of dots) of the X-coordinate corresponding to the t-coordinate which is equal to the value set in the register d. The calculated value is set in a register X. In the example shown in FIG. 4(*a*), when the value set in the register d is "50," the value of the X-coordinate corresponding to the value is "1.2 chr." In the embodiment, one character is configured by 48 dots square. Therefore, "57.6" in terms of the number of dots is set to the register X.

However, the concept of dots is based on an integer. Therefore, the CPU 10 sets in step Sb11 the integer portion of the value set in the register X, to a register C, and judges in step Sb12 whether the integer value coincides with the value set in the register B or not. As described above, the value set in the register B indicates the accumulated number of dots which have been changed in color after the word display event. If the value set in the register B coincides with the integer value set in the register C, it means that the color change is not required in the present interruption process.

If the judgement result of step Sb12 is "NO," therefore, it is not necessary to execute the processes of subsequent steps Sb12 and Sb13. Consequently, the CPU 10 skips the process procedure to step Sb14. If the judgement result is "YES," the CPU 10 subtracts in step Sb13 the value set in the register B from the integer value set in the register C, and sets the subtraction result to a register P. The value set in the register C indicates the number of dots by which the position of the dot to be changed in color in the present interruption process is separated from the left end of the word display region, and the value set in the register B indicates the accumulated number of dots which have been actually changed in color in the previous and former interruption processes. The subtraction of the latter value from the former value results in the calculation of the number of dots which are to be changed in color in the present interruption process. Therefore, the CPU 10 instructs in step Sb14 the video circuit 18 in the following manner. Namely, the CPU 10 instructs the video circuit 18 so that, if the color change has not been conducted, the color change of the dot string is started from the most left end of the word portion, and, if a part of the word portion has been changed in color, the string of dots the number of which is counted from the color changed part and equal to the subtraction result is changed in color.

In order to incorporate the number of dots which are actually changed in color in the present interruption process into the accumulated number of dots which have been changed in color in the previous and former interruption processes, the CPU 10 adds in step Sb15 the value of the register P to that of the register B so as to reset the value of the register B. In correspondence with the present activation of the interruption process, the CPU 10 increments in step Sb16 the value set in the register d by "1," and then terminates the interruption process.

<3: Specific example of color change>

Figure 3:
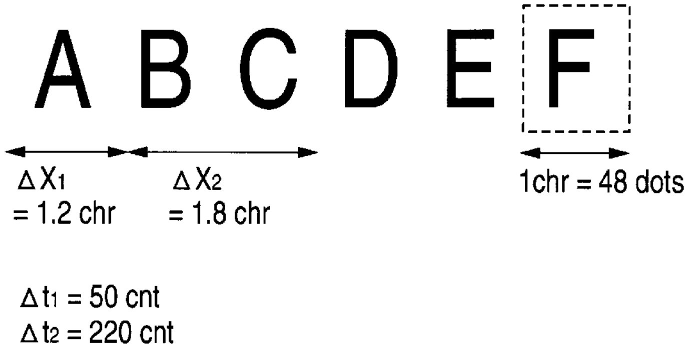
FIG. 3 is a diagram showing an example of a word display in the apparatus.

Next, the operation of the color change will be specifically described. Hereinafter, an example shown in FIG. 3 in which words to be displayed are "ABCDEF" and the warp sequence for the word display event is as follows: $\Delta X_1$=1.2 chr, $\Delta t_1$=50 cnt, $\Delta X_2$=1.8 chr, and $\Delta t_2$=220 cnt will be described.

In this case, when the progress of the performance reaches the timing when the words are to be displayed, i.e., when the duration of the word track becomes zero, the words "ABCDEF" are first displayed in step Sb3 of the interruption process in accordance with the word display event data, all of the color change function data $\Delta X_1$ to $\Delta X_n$ and $\Delta t_1$ to $\Delta t_n$ are read in step Sb6, and the color change function such as shown in FIG. 4(*a*) is specified in step Sb7. In the present interruption process, the value of the register d is zero. Therefore, the word color change is not conducted, and the interruption process is terminated while only the operation of incrementing the value of the register d by "1" so that the value is set to be "1" is conducted in step Sb16.

When the interruption process is activated next time, the processes of steps Sb3, Sb4, and Sb6 to Sb7 are skipped, and a value "0.03 chr" corresponding to the value "1" set in the register d is obtained by using the color change function. In the embodiment, one character is configured by 48 dots square. Consequently, the value of X corresponding to the value of the register d is calculated as "1.4" (=0.03×48).

In the present interruption process, therefore, the integer portion "1" is extracted in step Sb11, and the color of the string of one dot which is at the left end of the word display region is changed in step Sb14. Then, the accumulation of the register B is started, and the value of the register d is set in step Sb16 to be "2."

When the interruption process is further activated, the processes of steps Sb3, Sb4, and Sb6 to Sb9 are similarly skipped, and a value "0.06 chr" corresponding to the value "2" set in the register d is obtained by using the color change function. The value of X is calculated as "2.9" (=0.06×48).

In the present interruption process, therefore, the integer portion "2" is extracted (step Sb11). Since the string of "1" dot has been changed in color in the previous interruption process, "1" which is obtained by subtracting "1" from "2" is set in the register P (step Sb13), and the color of the string of one dot counted from the portion which has been already changed in color is changed (step Sb14). In step Sb15, "2" which is obtained by accumulating "1" dot the color of which is changed in the present interruption process to "1" dot the color of which was changed in the previous interruption process is set to the register B. In step Sb16, the value of the register d is set to be "3."

Thereafter, a similar interruption process is repeatedly conducted at a number equal to the total number of the data $\Delta t_1$ to $\Delta t_n$, and the words are erased in step Sb19. Then, step Sb17 is executed until the timing of the next word display event.

According to the word display of the karaoke apparatus of the embodiment, the word display region is divided into several sections, the time period required for conducting a color change in each of the sections is individually designated as the color change function data, and the color change is conducted in accordance with the color change function which is specified so as to smoothly pass the sections. Therefore, the color change can be conducted very smoothly in a stepless manner, by means of at least two sets of color change function data.

<4: Modifications>

In the embodiment described above, a spline function, or a function of degree n is used for specifying the color change function. The invention is not restricted to this. For example, a Bezier function or the like may be used. Such functions may be combinedly used for each section.

The color change function is specified so as to pass coordinates designated by the color change function data. Alternatively, the function may pass the vicinity of the coordinates. In summary, the color change function is requested only to be specified by using coordinates designated by the color change function data.

As described above, according to the invention, a color change of words can be smoothly conducted, and the change requires only a very small amount of data.

What is claimed is:

1. An apparatus for displaying words in a karaoke system, comprising:

word data supplying means for supplying word data indicative of words to be displayed in accordance with a progress of a performance;

section data supplying means for dividing a word display region which is to be displayed in accordance with the word data, into two or more sections, and for supplying section length data indicative of a length of each of the sections, and section time period data indicative of a time period required for changing a color of words in the section;

color change instructing means for obtaining a word color change function which passes one of coordinates and the vicinity of the coordinates, said coordinates being specified by the supplied section length data and section time period data, and for instructing a color change in accordance with the function; and word displaying means for changing the color of the words which are displayed on the basis of the word data, in accordance with said color change instructing means.

2. An apparatus for displaying words in a karaoke system according to claim 1, wherein said color change instructing means detects a section in which a section length is zero and a section time period is not zero, from the supplied section length data and section time period data, interpolates the section by a linear function, and obtains the color change function of a section other than the detected section.

3. An apparatus for displaying words in a karaoke system according to claim 1, wherein said color change instructing means causes the color change function to indicate a length of a display region of words a color of which is to be changed, with respect to a time after words are displayed in accordance with the word data.

4. An apparatus for displaying words in a karaoke system according to claim 1, wherein said color change instructing means obtains a number of dots a color of which is to be changed, for each unit time on the basis of the color change function, and instructs a color of an increased number of dots as compared with a previously obtained number of dots, to be changed.

5. A method for displaying words in a karaoke system, comprising:

supplying word data indicative of words to be displayed in accordance with a progress of a performance;

dividing a word display region which is to be displayed in accordance with the word data, into two or more sections, supplying section length data indicative of a length of each of the sections, and section time period data indicative of a time period required for changing a color of words in the section;

obtaining a word color change function which passes one of coordinates and the vicinity of the coordinates, said coordinates being specified by the supplied section length data and section time period data to instruct a color change in accordance with the function; and changing the color of the words which are displayed on the basis of the word data, in accordance with said color change instruction.

* * * * *